United States Patent
Chae et al.

(10) Patent No.: US 7,807,214 B2
(45) Date of Patent: Oct. 5, 2010

(54) DISPENSING APPARATUS FOR LIQUID CRYSTAL DISPLAY PANEL AND DISPENSING METHOD USING THE SAME

(75) Inventors: Kyung Su Chae, Daegu (KR); Sang Ho Park, Busan (KR); Se Joon Baek, Busan (KR)

(73) Assignee: LG Display Co., Ltd., Seoul (KR)

( * ) Notice: Subject to any disclaimer, the term of this patent is extended or adjusted under 35 U.S.C. 154(b) by 1327 days.

(21) Appl. No.: 10/825,362

(22) Filed: Apr. 16, 2004

(65) Prior Publication Data

US 2005/0112283 A1   May 26, 2005

(30) Foreign Application Priority Data

Nov. 22, 2003   (KR)   ...................... 10-2003-0083343

(51) Int. Cl.
B05D 5/12 (2006.01)
B05D 1/02 (2006.01)

(52) U.S. Cl. .................... 427/58; 427/421.1; 427/427.2

(58) Field of Classification Search ............. 427/421.1, 427/424, 58, 427.2
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake | |
| 4,653,864 A | 3/1987 | Baron | |
| 4,691,995 A | 9/1987 | Yamazaki | |
| 4,775,225 A | 10/1988 | Tsuboyama | |
| 5,247,377 A | 9/1993 | Omeis | |
| 5,263,888 A | 11/1993 | Ishihara | |
| 5,292,368 A * | 3/1994 | Komine et al. | 118/315 |
| 5,379,139 A | 1/1995 | Sato | |
| 5,406,989 A | 4/1995 | Abe | |
| 5,499,128 A | 3/1996 | Hasegawa | |
| 5,507,323 A | 4/1996 | Abe | |
| 5,511,591 A | 4/1996 | Abe | |
| 5,539,545 A | 7/1996 | Shimizu | |
| 5,548,429 A | 8/1996 | Tsujita | |
| 5,642,214 A | 6/1997 | Ishii | |
| 5,680,189 A | 10/1997 | Shimizu | |

(Continued)

FOREIGN PATENT DOCUMENTS

CN   1447157 A   10/2003

(Continued)

*Primary Examiner*—Timothy H Meeks
*Assistant Examiner*—James Lin
(74) *Attorney, Agent, or Firm*—McKenna Long & Aldridge LLP

(57) ABSTRACT

An apparatus for dispensing a liquid crystal display panel includes a table for holding a substrate, the substrate having a plurality of picture display regions; and at least one dispenser installed at a side of the table, the dispenser having at least one dispensing material to be supplied to the substrate. A dispensing method for a liquid crystal display panel in accordance with the present invention includes providing at least one substrate on a table, wherein a plurality of unit panels are to be formed from the at least one substrate; supplying a dispensing material to a plurality of dispensers; and supplying at least one dispensing material to the plurality of unit panels on at least one substrate through nozzles.

4 Claims, 6 Drawing Sheets

U.S. PATENT DOCUMENTS

| | | | |
|---|---|---|---|
| 5,742,370 A | 4/1998 | Kim | |
| 5,757,451 A | 5/1998 | Miyazaki | |
| 5,852,484 A | 12/1998 | Inoue | |
| 5,854,664 A | 12/1998 | Inoue | |
| 5,861,932 A | 1/1999 | Inata | |
| 5,875,922 A | 3/1999 | Chastine | |
| 5,952,676 A | 9/1999 | Sato | |
| 5,956,112 A | 9/1999 | Fujimori | |
| 6,001,203 A | 12/1999 | Yamada | |
| 6,011,609 A | 1/2000 | Kato | |
| 6,016,178 A | 1/2000 | Kataoka | |
| 6,016,181 A | 1/2000 | Shimada | |
| 6,055,035 A | 4/2000 | Von Gutfeld | |
| 6,163,357 A | 12/2000 | Nakamura | |
| 6,219,126 B1 | 4/2001 | Von Gutfeld | |
| 6,226,067 B1 | 5/2001 | Nishiguchi | |
| 6,236,445 B1 | 5/2001 | Foschaar | |
| 6,304,306 B1 | 10/2001 | Shiomi | |
| 6,304,311 B1 | 10/2001 | Egami | |
| 6,337,730 B1 | 1/2002 | Ozaki | |
| 6,414,733 B1 | 7/2002 | Ishikawa | |
| 2001/0013920 A1* | 8/2001 | Hashimoto et al. | 349/187 |
| 2002/0024628 A1* | 2/2002 | Walker et al. | 349/155 |
| 2003/0083203 A1* | 5/2003 | Hashimoto et al. | 505/100 |

FOREIGN PATENT DOCUMENTS

| | | |
|---|---|---|
| EP | 1 003 066 A1 | 5/2000 |
| JP | 05-127179 | 5/1933 |
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-099760 | 4/1998 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |

| | | | | | |
|---|---|---|---|---|---|
| JP | 2001-142074 | 5/2001 | JP | 2002-131762 | 5/2002 |
| JP | 2001-147437 | 5/2001 | JP | 2002-139734 | 5/2002 |
| JP | 2001-154211 | 6/2001 | JP | 2002-156518 | 5/2002 |
| JP | 2001-166272 | 6/2001 | JP | 2002-169166 | 6/2002 |
| JP | 2001-166310 | 6/2001 | JP | 2002-169167 | 6/2002 |
| JP | 2001-183683 | 7/2001 | JP | 2002-182222 | 6/2002 |
| JP | 2001-201750 | 7/2001 | JP | 2002-202512 | 7/2002 |
| JP | 2001-209052 | 8/2001 | JP | 2002-202514 | 7/2002 |
| JP | 2001-209056 | 8/2001 | JP | 2002-214626 | 7/2002 |
| JP | 2001-209057 | 8/2001 | JP | 2002-229042 | 8/2002 |
| JP | 2001-209058 | 8/2001 | JP | 2002-236276 | 8/2002 |
| JP | 2001-209060 | 8/2001 | JP | 2002-258299 | 8/2002 |
| JP | 2001-215459 | 8/2001 | JP | 2002-236292 | 9/2002 |
| JP | 2001-222017 | 8/2001 | JP | 2002-277865 | 9/2002 |
| JP | 2001-235758 | 8/2001 | JP | 2002-277866 | 9/2002 |
| JP | 2001-255542 | 9/2001 | JP | 2002-277881 | 9/2002 |
| JP | 2001-264782 | 9/2001 | JP | 2002-287156 | 10/2002 |
| JP | 2001-272640 | 10/2001 | JP | 2002-296605 | 10/2002 |
| JP | 2001-281675 | 10/2001 | JP | 2002-311438 | 10/2002 |
| JP | 2001-281678 | 10/2001 | JP | 2002-311440 | 10/2002 |
| JP | 2001-282126 | 10/2001 | JP | 2002-311442 | 10/2002 |
| JP | 2001-305563 | 10/2001 | JP | 2002-318547 | 10/2002 |
| JP | 2001-330837 | 11/2001 | JP | 2002-323687 | 11/2002 |
| JP | 2001-330840 | 11/2001 | JP | 2002-323694 | 11/2002 |
| JP | 2001-356353 | 12/2001 | JP | 2002-333628 | 11/2002 |
| JP | 2001-356354 | 12/2001 | JP | 2002-333635 | 11/2002 |
| JP | 2002-014360 | 1/2002 | JP | 2002-333843 | 11/2002 |
| JP | 2002-023176 | 1/2002 | JP | 2002-341329 | 11/2002 |
| JP | 2002-049045 | 2/2002 | JP | 2002-341355 | 11/2002 |
| JP | 2002-079160 | 3/2002 | JP | 2002-341356 | 11/2002 |
| JP | 2002-080321 | 3/2002 | JP | 2002-341357 | 11/2002 |
| JP | 2002-082340 | 3/2002 | JP | 2002-341358 | 11/2002 |
| JP | 2002-090759 | 3/2002 | JP | 2002-341359 | 11/2002 |
| JP | 2002-090760 | 3/2002 | JP | 2002-341362 | 11/2002 |
| JP | 2002-107740 | 4/2002 | JP | 2003-057666 | 2/2003 |
| JP | 2002-122870 | 4/2002 | KR | 2000-0035302 | 6/2000 |
| JP | 2002-122872 | 4/2002 | | | |
| JP | 2002-122873 | 4/2002 | | | |

* cited by examiner

DISPENSING APPARATUS FOR LIQUID CRYSTAL DISPLAY PANEL AND DISPENSING METHOD USING THE SAME

This application claims the benefit of Korean Patent Application No. 2003-83343, filed on Nov. 22, 2003, which is hereby incorporated by reference for all purposes as if fully set forth herein.

BACKGROUND OF THE INVENTION

1. Field of the Invention

The present invention relates to a dispensing apparatus for a liquid crystal display panel, and more particularly, to a complex dispensing apparatus capable of simplifying fabrication processes by forming of silver paste and sealant with one complex line and a dispensing method for a liquid crystal display panel using the same.

2. Discussion of the Related Art

In the recent information oriented society, importance of visual display devices has increased. Requirements for better display devices having low power consumption, thin thickness, light weight and high picture quality have to be satisfied. Because the characteristics of LCD (liquid crystal display) devices satisfy all those conditions and are suitable for mass-production, various new LCD products have been rapidly developed. LCD devices have become the core industry gradually replacing the conventional CRT (cathode ray tube) devices.

In general, the liquid crystal display devices display a picture by adjusting a light transmittance ratio of liquid crystal cells by respectively supplying a data signal according to picture information to the liquid crystal cells arranged as a matrix form.

Generally, the liquid crystal display devices include a liquid crystal display panel having a driving circuit unit in order to output pictures, a backlight unit installed at the lower portion of the liquid crystal display panel to emit light to the liquid crystal display panel, and a chassis, etc. for combining and supporting the backlight unit and the liquid crystal display panel.

Hereinafter, the liquid crystal display panel will be described in detail with reference to FIG. 1.

FIG. 1 is a schematic plan view illustrating a structure of a related art liquid crystal display panel.

In FIG. 1, the liquid crystal display panel largely includes of an array substrate 20 having a driving circuit unit (not shown), a color filter substrate 30, and a liquid crystal layer (not shown) formed between the array substrate 20 and the color filter substrate 30.

Herein, on the array substrate 20, a plurality of gate lines 21 and data lines 22 are arranged lengthwise and breadthwise, respectively, on the substrate 20 to define a plurality of pixel regions. In addition, a TFT (thin film transistor) (not shown) is formed at each crossing of a gate line 21 and a data line 22, and a pixel electrode (not shown) is formed at each pixel region.

In addition, a certain portion (consisting of a shorter side and a longer side) of the array substrate 20 extends beyond the respective sides of the color filter substrate 30 to allow for the formation of the driving circuit unit for driving the liquid crystal display panel. In particular, a gate pad unit 24 is formed at the extended shorter side of the array substrate 20, and a data pad unit 23 is formed at the extended longer side of the array substrate 20.

Herein, the gate pad unit 24 supplies a scanning signal from a gate driving circuit unit (not shown) to the gate line 21 of each pixel region as a picture display region 25, and the data pad unit 23 supplies picture information from a data driving circuit (not shown) to the data line 22 of each pixel region.

In the meantime, a color filter (not shown) for implementing color and a common electrode (not shown) as an opposed electrode of the pixel electrode formed on the array substrate 20 is formed in the picture display region of the color filter substrate 30.

A cell gap is formed between the array substrate 20 and the color filter substrate 30 using a spacer (not shown) to separate the substrates uniformly, and they are attached by a seal pattern 40 formed at the edge of the picture display region 25. Accordingly, a unit liquid crystal display panel is obtained. The two substrates 20, 30 are attached using an alignment key (not shown) formed at the array substrate 20 or the color filter substrate 30.

In order to fabricate the above-mentioned liquid crystal display panel, in particular, in order to attach the array substrate to the color filter substrate, a process for forming a seal pattern on the edge of the picture display region is required, and a general seal pattern forming method will be described in detail with reference to accompanying drawings.

First, FIGS. 2A and 2B are exemplary views illustrating forming a seal pattern by a general screen-printing method.

As depicted in FIGS. 2A and 2B, a screen mask 50 is patterned to expose a plurality of seal patterns 40A-40C forming regions selectively and a rubber squeegee 55 is used for forming the plurality of seal patterns 40A-40C simultaneously by selectively supplying a sealant 70 to the substrate 10 through the screen mask 50.

The plurality of seal patterns 40A-40C formed on the substrate 10 provide a gap in which a liquid crystal layer (not shown) is formed and prevent liquid crystal from being leaked from picture display regions 25A-25C.

Accordingly, the plural seal patterns 40A-40C are formed along the edge of the picture display regions 25A-25C, and liquid crystal injection holes 45A-45C are formed at a side of the seal patterns 40A-45A respectively.

The above-mentioned screen-printing method includes forming a plurality of seal patterns 40A-40C on the substrate 10 by coating sealant 70 onto the screen mask 50 on which the plurality of seal patterns forming regions are patterned and printing the seal patterns 40A-40C by applying the rubber squeegee 55 and drying the seal patterns 40A-40C for leveling by evaporating a solvent contained in the plurality of seal patterns 40A-40C.

Because of the convenient processing advantage, the screen-printing method is generally used. However, forming the plurality of seal patterns 40A-40C by coating the sealant 70 on the entire surface of the screen mask 50 and printing it with the rubber squeegee 55 causes a large amount of sealant 70 to be consumed.

In addition, the contact of the screen mask 50 and the substrate 10 may cause an alignment layer (not shown) formed on the substrate 10 to have a rubbing defect, and accordingly picture quality of the liquid crystal display devices may be reduced.

Accordingly, in order to solve the problem of the screen-printing method, a seal dispensing method has been presented.

FIG. 3 is an exemplary view illustrating forming a seal pattern by a related art seal dispensing method. In FIG. 3, a sealant is discharged by applying a uniform pressure to a plurality of syringes (180A-180C) arranged fixed at a support rod 185 while a table 115 on which a substrate 110 is loaded is moved front and rear (and right and left). Thus, a plurality of seal patterns 140A-140C are formed along the edge of picture display regions 125A-125C of the substrate 110.

In the seal dispensing method, by selectively supplying a sealant only to the edge of the picture display regions 125A-125C of the substrate 110, the amount of the sealant consumed can be reduced. In addition, because the plurality of syringes 180A-180C do not contact the picture display regions 125A-125C of the substrate 110, rubbing inferiority of an alignment layer (not shown) can be prevented. Accordingly, picture quality of a liquid crystal display can be improved.

However, the seal dispensing method cannot efficiently accommodate substrates having increased area or picture display regions having different areas (125A-125C) formed on the substrate 110, which may result from a change in the model or type of a liquid crystal display panel being manufactured.

In more detail, a recent trend to liquid crystal display panel having a large area, the area of the substrate 110 for fabricating a large-sized liquid crystal display panel is increased. Accordingly forming positions of the seal patterns 140A-140C are changed on the substrate 110. In the above-mentioned seal dispensing method, when forming positions of the seal patterns 140-140C are changed, the dispensing apparatus has to be reconstructed by disassembling and reassembling the support rod 185 and the syringes 180A-180C.

When a model of the liquid crystal display panel is changed, an area of the picture display regions 125A-125C formed on the substrate 110 is changed, and accordingly positions of the seal patterns formed at the edge of the picture display region 125A-125C are changed. In the seal dispensing method, when positions of the seal patterns 140A-140C are changed, by disassembling and re-assembling the support rod 185 and the syringes 108A-180C, the dispensing apparatus has to be reconstructed.

Accordingly, man-power is required, a time required for processing is increased, and, accordingly, productivity may be lowered.

In the meantime, either before or after the seal dispensing step, a silver dot is formed on the array substrate or the color filter substrate. Hereinafter, the silver dot will be described with reference to accompanying drawings.

FIG. 4 is a schematic sectional view illustrating the edge of the liquid crystal display panel in FIG. 1.

In FIG. 4, an array substrate 120 and a color filter substrate 130 face each other and are attached so as to have a certain gap by a spacer 155 and a seal pattern 140, and a liquid crystal layer 160 is formed in the gap between the array substrate 120 and the color filter substrate 130.

Herein, not shown in FIG. 4, a gate line to which a scanning signal is applied through a gate pad unit and a data line to which picture information is applied through a data pad unit are arranged so as to cross each other in a picture display region of the array substrate 120, and a TFT (thin film transistor) for switching a liquid crystal cell and a pixel electrode contacted to the TFT are formed in the crossing region.

In addition, a color filter (not shown) divided-coated by cell regions by a black matrix (not shown) and a common electrode 138 for driving a liquid crystal layer 160 with a pixel electrode formed on the array substrate 120 are formed in a picture display region of the color filter substrate 130.

Herein, a common voltage wiring 139 for applying a common voltage to a common electrode 138 on the color filter substrate 130 is formed on the array substrate 120, and the common voltage wiring 139 and the common electrode 138 are electrically connected through a silver dot 190 formed on the array substrate 120 or the color filter substrate 130.

In the meantime, because the silver dot and the seal pattern are formed in different processing steps by using different dispensing apparatus, a time required for the entire processing is increased, and accordingly productivity may be lowered.

In particular, in case of performing the general processing even in fabrication of liquid crystal display devices not requiring the silver dot forming process (for example, IPS (in-plane switching) liquid crystal display devices), efficiency related to facility usage and fabrication time may be lowered.

SUMMARY OF THE INVENTION

Accordingly, the present invention is directed to a dispensing apparatus for liquid crystal display panel and dispensing method using the same that substantially obviates one or more of the problems due to limitations and disadvantages of the related art.

In order to solve the above-mentioned problem, it is an advantage of the present invention to provide a complex dispensing apparatus capable of simplifying fabrication processes by forming of silver paste and sealant with one complex line and a dispensing method for a liquid crystal display panel using the same.

In addition, it is another advantage of the present invention to provide a dispenser for a liquid crystal display panel capable of coping with fabrication of a large-sized liquid crystal display panel and performing the entire dispensing process as in-line.

In order to achieve the above-mentioned advantages, an apparatus for dispensing a liquid crystal display panel includes a table for holding a substrate, the substrate having a plurality of picture display regions; and at least one dispenser installed at a side of the table, the dispenser having at least one dispensing material to be supplied to the substrate.

A dispensing method for a liquid crystal display panel in accordance with the present invention includes providing at least one substrate on a table, wherein a plurality of unit panels are to be formed from the at least one substrate; supplying a dispensing material to a plurality of dispensers; and supplying at least one dispensing material to the plurality of unit panels on at least one substrate through nozzles.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Hereinafter, an embodiment of a silver-sealant complex dispensing apparatus and a dispensing method for a liquid crystal display panel using the same in accordance with the present invention will be described.

Figure 1:
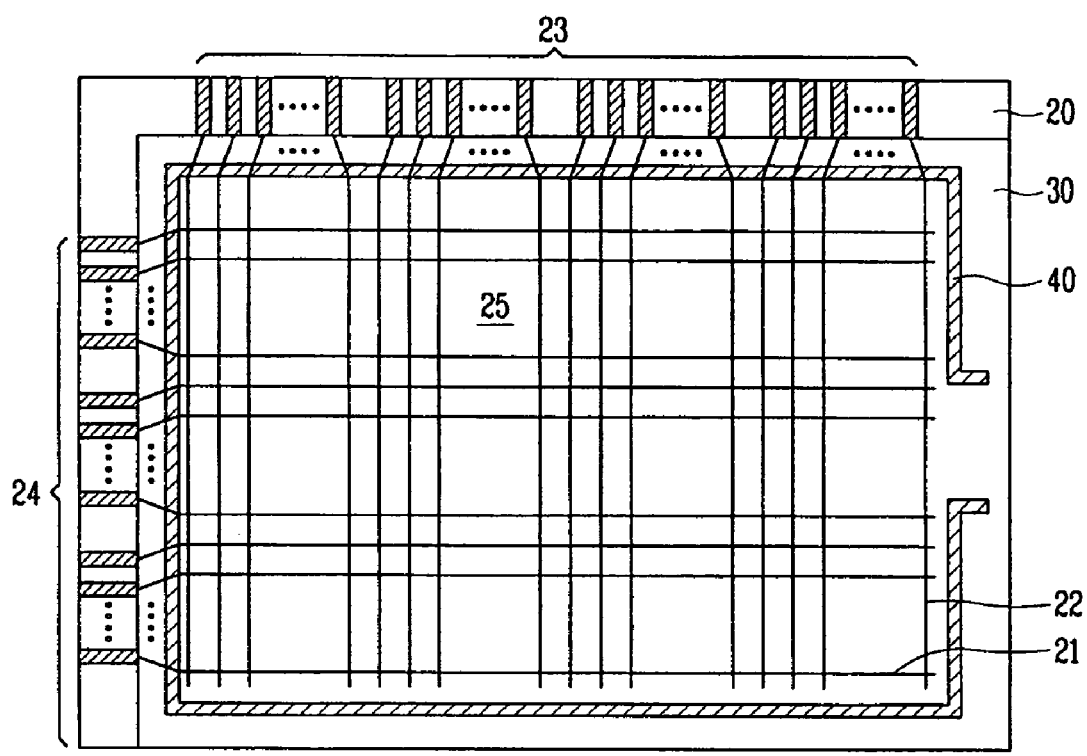
FIG. 1 is a schematic plan view illustrating a structure of a related art liquid crystal display panel.
Figure 2A:
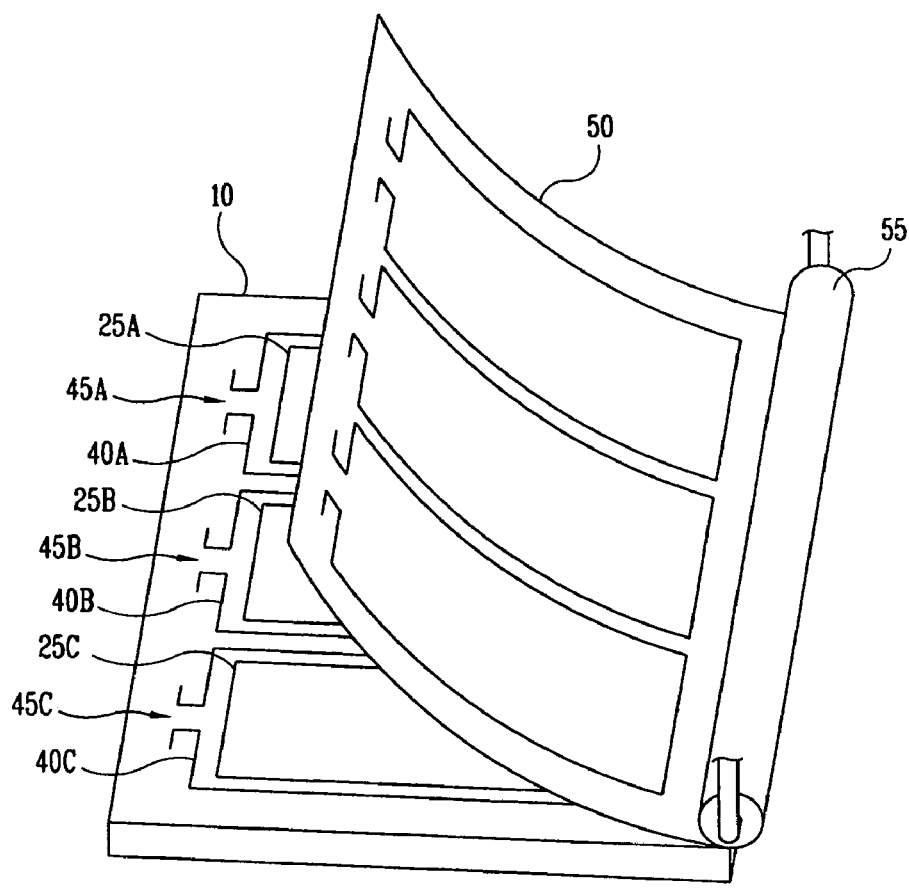
FIGS. 2A and 2B are exemplary views illustrating forming a seal pattern by a related art screen-printing method.
Figure 2B:
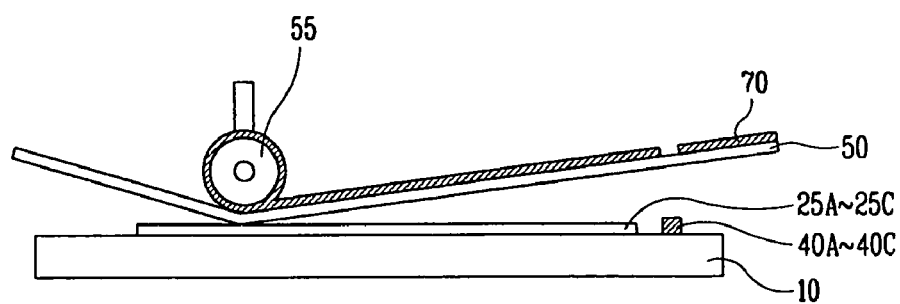
Figure 3:
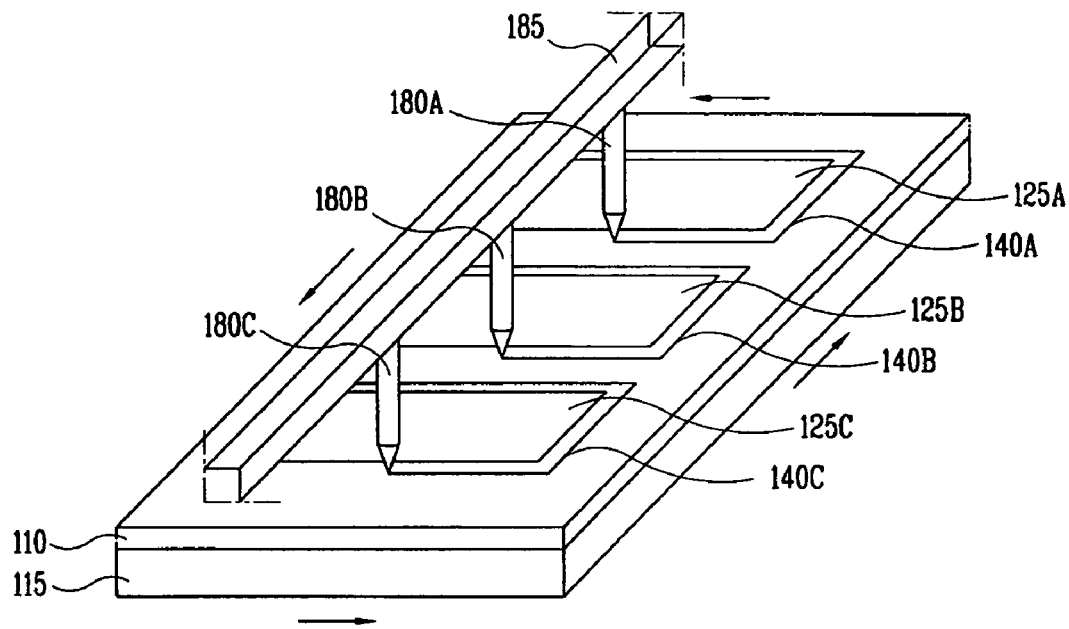
FIG. 3 is an exemplary view illustrating forming a seal pattern by a related art seal dispensing method.
Figure 4:
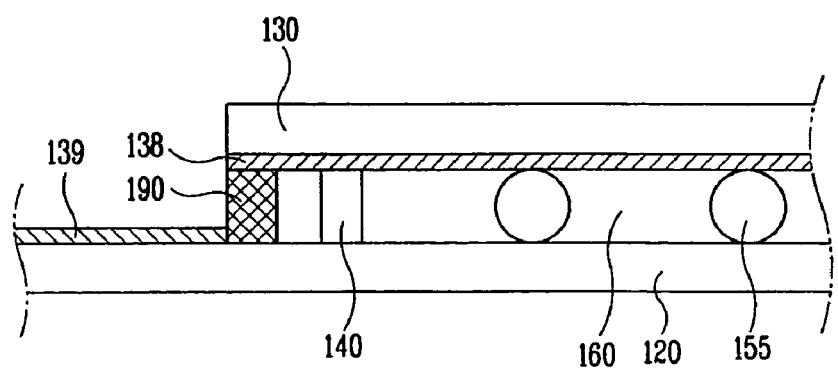
FIG. 4 is a schematic sectional view illustrating the edge of the liquid crystal display panel in FIG. 1.
Figure 5A:
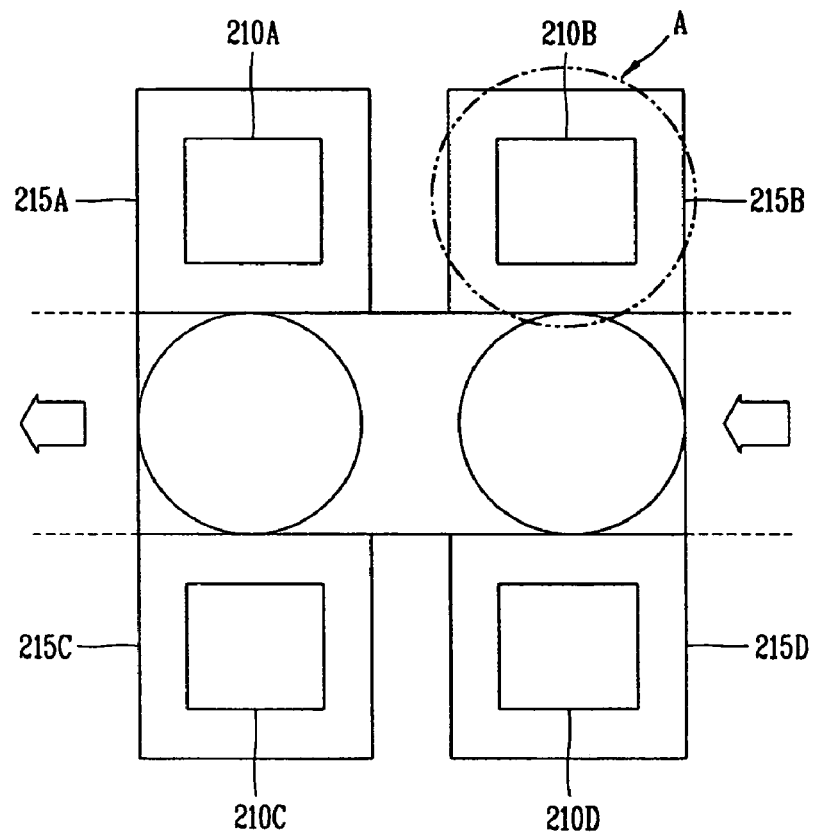
FIG. 5A is a schematic exemplary view illustrating a silver-sealant complex dispensing apparatus in accordance with an embodiment of the present invention.
Figure 5B:
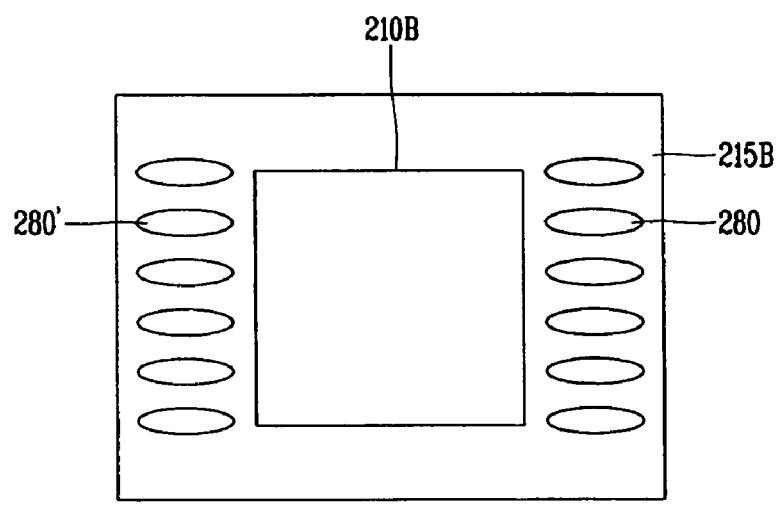
FIG. 5B is a schematic enlarged view illustrating a part A of the silver-sealant complex dispensing apparatus in FIG. 5A.

FIG. 5A is a schematic exemplary view illustrating a silver-sealant complex dispensing apparatus in accordance with an embodiment of the present invention, and FIG. 5B is a schematic enlarged view illustrating a part A of the silver-sealant complex dispensing apparatus in FIG. 5A.

First, In FIG. 5A, the dispensing apparatus in accordance with the present invention comprises a plurality of tables 215A-215D on which a substrate (210A-210D) selected in a cell process performed in a production line form is loaded. Namely, a first mother substrate having an array substrate or a second mother substrate having a color filter substrate is loaded for dispensing. Herein, above the tables 215A-215D, a plurality of silver-sealant complex dispensers (not shown) for forming a silver dot and a seal pattern with one apparatus is installed.

Herein, in the exemplary embodiment of the present invention, a first to fourth tables 215A-215D in 2 rows×2 columns may operate independently along a transferring path of the plurality of substrates 210A-210D. The substrates 210A-210D are constructed to be respectively loaded onto the first to fourth tables 215A-215D for silver dot or sealant forming. However, the present invention is not so limited; that is, a plurality of dispensing units of M rows×N columns may be formed to perform the process quickly.

FIG. 5B is a schematic view of a dispensing unit (or table). As illustrated in FIG. 5B, for example, six first dispensers 280 for forming a seal pattern and six second dispensers 280' for forming a silver dot are installed on both sides of the table 215B on which the substrate 210B is loaded. Although not shown in drawings, the dispensers 280, 280' may be formed as a plurality of robot arms on which a plurality of syringes having sealant or silver paste are installed respectively and arranged on both sides of the table 215B. Herein, a plurality of nozzles (not shown) for forming a plurality of silver dots or seal patterns on the substrate 210B may be installed at the end of the syringes respectively.

In the dispensing apparatus in accordance with the present invention, when the plurality of substrates 210A-210D having plurality of picture display regions, which correspond to unit panels to be formed, are loaded onto the first to the fourth tables 215A-215D, seal pattern and/or silver dot is formed along the edge of each picture display region using the dispensers 280, 280' installed on both sides of the tables 215A-215D.

Herein, in the exemplary embodiment of the present invention, the dispensing process is performed by using the six dispensers respectively installed at both sides of the table. However the present invention is not so limited and the number of the dispensers may be varied according to a size of a substrate and a model of a liquid crystal display panel. In more detail, in actual fabrication of a liquid crystal display panel, a plurality of picture display regions having a matrix of M rows×N columns may be formed on a substrate, corresponding to the display regions, the number and arrangement of the dispensers may be varied.

In addition, as described in the present invention, when a dispenser for seal pattern and a dispenser for silver dot are respectively formed at both sides of one table, a seal process and a silver dot process may be performed all in the same apparatus, and accordingly processing steps may be reduced in comparison with a case performing the sealing process and the silver process separately.

In the meantime, the dispensing unit includes the first dispenser for forming a seal pattern and the second dispenser for forming a silver dot, however the syringe may be filled with sealant instead of silver paste to form a seal pattern if silver dot is not required according to a model of a liquid crystal display panel.

In more detail, in the present invention, the liquid crystal display device in which silver dot forming is required is described as an example. However, when there is no need to perform the silver dot process, such as fabricating IPS liquid crystal display devices, a seal process is performed by filling sealant in the syringe of the dispenser for forming the silver dot, and decreased efficiency because of the idle apparatus may be prevented.

Herein, examples of the sealant include UV-hardening sealant such as acrylic resin, thermosetting sealant such as epoxy resin, or UV hardening-thermosetting sealant such as acryl-epoxy mixed sealant.

In addition, the seal pattern formed by the sealant has an open shape or a closed shape surrounding the edge of the picture display region.

In the meantime, an embodiment of a dispensing method using the dispensing unit in accordance with the present invention will be described.

Figure 6:
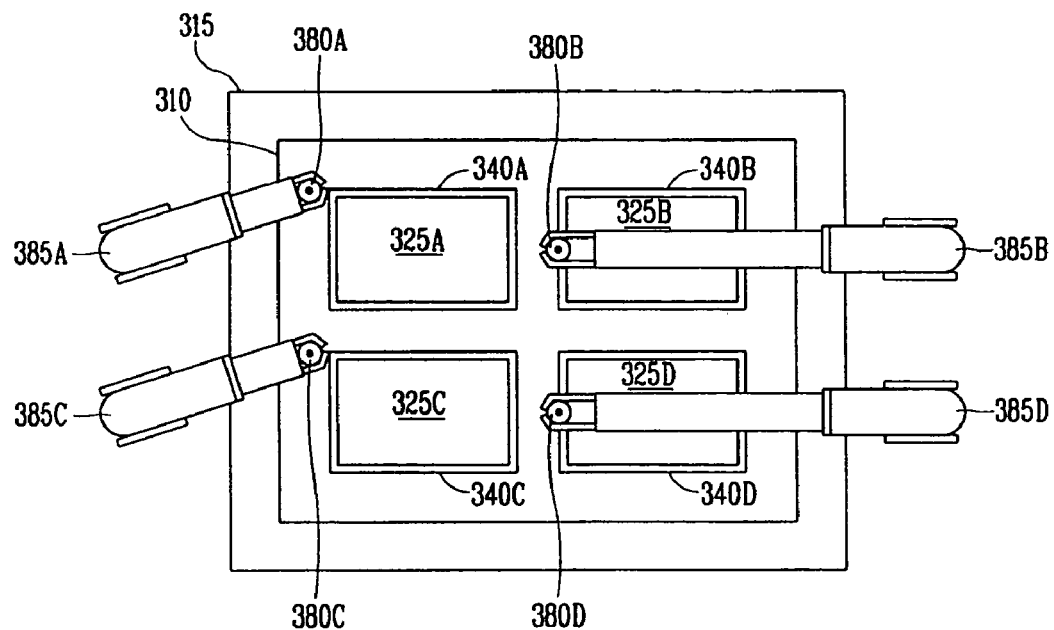
FIG. 6 is an exemplary view illustrating a dispensing method in accordance with a first embodiment of the present invention.

FIG. 6 is an exemplary view illustrating a dispensing method in accordance with a first embodiment of the present invention. A process for forming a seal pattern and a silver dot on a large-sized substrate with a dispenser filled with sealant and silver paste will be described.

Herein, the dispenser may correspond to fabrication of a large-sized liquid crystal display panel and perform the dispensing process as in-line.

In FIG. 6, the dispensing unit includes a table 315 on which a large-sized substrate 310 having a plurality of picture display regions 325A-325D is loaded; and plural robot arms 385A-385D, on which a plurality of syringes 380A-380D filled with sealant or silver paste are respectively installed, are arranged on both sides of the table 315.

At the end of the syringes 380A-380D, a plurality of nozzles (not shown) are formed in order to form a plurality of seal patterns 340A-340D or silver dot (not shown) on the edge of the picture display regions 325A-325D of the substrate 310.

The substrate 310 is a first mother substrate as a large-sized glass material on which a plurality of array substrates are arranged or a second mother substrate as a large-sized glass material on which a plurality of color filter substrates are arranged.

Herein, the syringes 380A, 380C installed at the robot arms 385A, 385C installed at the left side of the table 315 are filled with silver paste, and the syringes 380B, 380D installed at the robot arms 385B, 385D installed at the right side of the table 315 are filled with sealant, however the present invention is not limited to that particular configuration.

In the meantime, when the substrate having the picture display regions 325A-325D of 2 rows×2 columns is loaded on the table 315, the seal patterns 340A-340D are formed along the edge of the picture display regions 325A-325D of 2 rows×2 columns by using the syringes 380B, 380D installed at the robot arms 385B, 385D arranged on the right side of the table 315, and the silver dots (not shown) are formed along the edge of the picture display regions 325A-325D of 2 rows×2 columns by using the syringes 380A, 380C installed at the robot arms 385A, 385C arranged on the left side of the table 315.

Herein, not shown in drawings, at least one silver dot is formed at the edge of the picture display region 325A-325D, and plural silver dots may be formed in consideration of signal characteristics.

In addition, while relative position relation of the table 315 and the plurality of syringes 380A-380D may vary, the plurality of seal patterns 340A-340D and silver dots are formed on the substrate 310 by supplying sealant and silver paste through the nozzles. Accordingly, the table 315 or at least one of the syringes 380A-380D may be moved horizontally. In addition, the robot arms 385A-385D respectively installed at the syringes 380A-380D may be arranged on both sides of the table 315 to correspond to the number of the array substrates or the color filter substrates arranged on the substrate 310. For example, when the picture display regions 325A-325D are formed to have a matrix of M rows×N columns, unlike FIG. 6, the robot arms 385A-385D are arranged on both sides of the table 315 to correspond to the entire area of the picture display regions 325A-325D having a matrix of M rows×N columns.

As described-above, the dispenser of the liquid crystal display panel in accordance with the present invention can perform seal pattern forming or silver dot forming by moving the syringe installed on a robot arm to a predetermined position above the table. Accordingly it is possible to instantly cope with a case in which an area of a substrate is increased or a model of a liquid crystal display panel is changed.

Accordingly, unlike the related art, dissembling construction parts of the dispenser, reassembling and reconstructing them are not required.

In addition, the dispenser of the liquid crystal display panel in accordance with the present invention may be applied very efficiently to forming a seal pattern and a silver dot in a method for simultaneously fabricating liquid crystal display panel having different sizes on a substrate.

Next, an embodiment of the present invention not requiring a silver dot process, such as the IPS type liquid crystal display, will be described.

Figure 7:
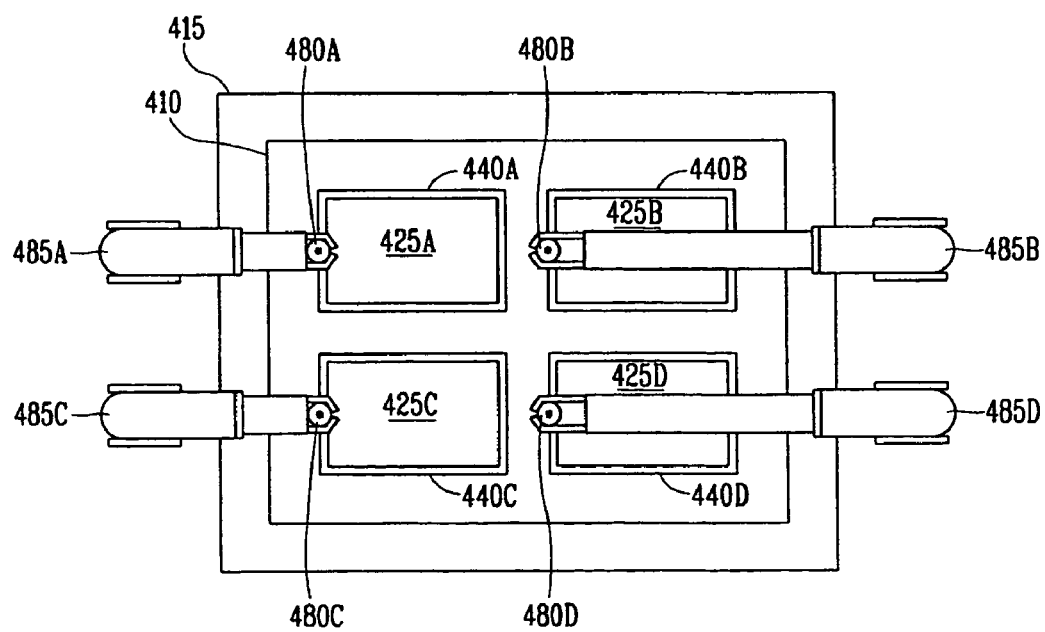
FIG. 7 is an exemplary view illustrating a dispensing method in accordance with a second embodiment of the present invention.

FIG. 7 is an exemplary view illustrating a dispensing method in accordance with a second embodiment of the present invention. A process for forming a seal pattern on a large-sized substrate with a dispenser filled with sealant will be described.

In more detail, except filling the dispenser not with silver paste, but with sealant, the embodiment in FIG. 7 has the same construction with the dispenser in FIG. 6.

In FIG. 7, the dispensing unit includes a table 415 on which a large-sized substrate 410 having a plurality of picture display regions 425A-425D is loaded; and a plurality of robot arms 485A-485D, to which a plurality of syringes 480A-480D filled with sealant are respectively installed, are arranged on both sides of the table 415.

Herein, at the end of the syringes 480A-480D, a plurality of nozzles (not shown) are formed in order to form a plurality of seal patterns 440A-440D on the edge of the picture display regions 425A-425D of the substrate 410.

While relative position relation of the table 415 and the plurality of syringes 480A-480D may vary, the plurality of seal patterns 440A-440D are formed on the substrate 410 by supplying sealant through the nozzles. Accordingly, the table 415 or at least one of the syringes 480A-480D may be moved horizontally.

In the meantime, when there is no need to perform the silver dot process as IPS (in plane switching) liquid crystal display devices, a seal process is performed by filling sealant in the syringe of the dispenser for forming the silver dot, and reduced process performance due to idle apparatus may be prevented.

In addition, the dispenser of the liquid crystal display panel in accordance with the present invention may be applied very efficiently to forming a seal pattern in a method for simultaneously fabricating liquid crystal display panels having different sizes on a substrate. With the trend to increase size of a substrate and a panel, the method may improve efficiency of the substrate by forming a small-sized module in a surplus area of the substrate.

In addition, in case of having different liquid crystal display modes on a substrate, for example, in fabricating of a twisted nematic mode and an IPS mode simultaneously, a seal pattern and a silver dot may be formed simultaneously. Forming an IPS mode on a substrate as a large module and forming a nematic mode on a surplus of the substrate as a small module is typical, however the present invention is not limited by that.

For example, besides the twisted nematic mode and the IPS mode being formed on the same mother substrate, the liquid crystal mode on the same mother substrate may include an IPS mode and a reflection mode, a semi-transmission mode, etc., or any other known mode.

In addition, the number of the liquid crystal display panels formed on the substrate may be varied according to a size of a substrate.

A method for fabricating plural liquid crystal display panels having different sizes on a substrate will be described.

For example, if a plurality of liquid crystal display panels having only a single first size are formed from a single mother substrate, a region in which a liquid crystal display panel having the single first size is not formed is unused. Accordingly, usage efficiency of the substrate is lowered. Thus, by fabricating a liquid crystal display panel having a second size smaller than the first size in the region (in which a liquid crystal display panel having the first size is not formed), usage efficiency of the substrate may be improved.

Figure 8:
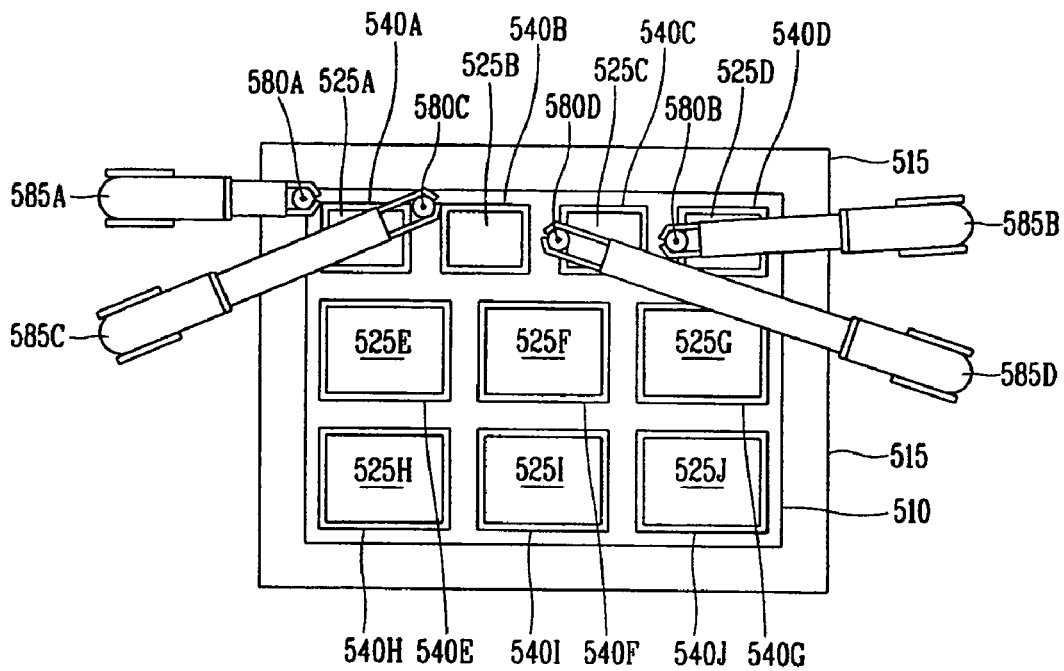
FIG. 8 is an exemplary view illustrating a dispensing method in accordance with a third embodiment of the present invention.

FIG. 8 is an exemplary view illustrating a dispensing method in accordance with a third embodiment of the present invention. A method for performing dispensing on a substrate on which a plurality of liquid crystal display panels having different sizes are formed simultaneously will be described.

Herein, in FIG. 8, by way of example, an IPS mode is constructed with a liquid crystal display panel having a first size, and a twisted nematic mode is constructed with a liquid crystal display panel having a second size.

In more detail, as depicted in FIG. 8, the dispensing unit includes a table 515 on which a large-sized substrate 510 having a plurality of picture display regions 525A-525J is loaded. A plurality of robot arms 585A-585D, to which a plurality of syringes 580A-580D filled with sealant or silver paste are respectively installed, are arranged on both sides of the table 515.

Herein, at the end of the syringes 580A-580D, a plurality of nozzles (not shown) are formed to form a plurality of seal patterns 540A-540J or silver dots (not shown) on the edge of the picture display regions 525A-525J of the substrate 510.

In this example, on the substrate 510, six first-sized IPS mode liquid crystal display panels (namely, IPS liquid crystal display panels in which first-sized picture display regions (525E-525J) are formed) are formed, four second-sized twisted nematic mode liquid crystal display panels (namely, twisted nematic liquid crystal display panels in which second-sized picture display regions (525A-525D) are formed) are formed, however the present invention is not so limited.

In addition, FIG. 8 shows simultaneously performing a seal process and a silver dot process on the second-sized liquid crystal display panel after finishing a seal process on the first-sized liquid crystal display panel, however the present invention is not so limited. For example, a seal process and a silver dot process may be performed on a plurality of liquid crystal display panels consisting of different sizes and modes with a plurality of dispensers by various methods.

In the third embodiment of the present invention, first seal patterns 540E-540J are formed along the edge of the picture display regions 525E-525J of the first-sized IPS mode liquid crystal display panels not requiring the silver dot process, and the seal patterns 525A-525D and the silver dot are simultaneously formed along the edge of the picture display regions 525A-525D of the second-sized nematic mode liquid crystal display panels.

In the meantime, in FIG. 8, only four robot arms 585A-585D, at which a plurality of syringes 580A-580D filled with sealant or silver paste are respectively installed, are arranged on both sides of the table 515 are illustrated to show dispensing onto the second-sized liquid crystal display panels.

In more detail, the syringes 580A, 580C of the robot arms 585A, 585C installed at the left side of the table 515 are filled with silver paste, and the syringes 580B, 580D of the robot arms 585B, 585D installed at the right side of the table 515 are filled with sealant. Accordingly, when a dispensing process is performed on the second-sized liquid crystal display panel on which the four picture display regions 525A-525D are formed, the seal patterns 540A-540D are formed along the edge of the four picture display regions 525A-525D by using the syringes 580B, 580D of the robot arms 585B, 585D arranged at the right side of the table 515, and the silver dots are formed along the edge of the four picture display regions 525A-525D by using the syringes 580A, 580C of the robot arms 585A, 585C arranged at the left side of the table 515.

As described-above, in the method for simultaneously fabricating different-sized a plurality of liquid crystal display panels on a substrate, the dispenser of the liquid crystal display panel in accordance with the present invention may cope very efficiently with a situation for forming seal patterns and silver paste simultaneously (in the same apparatus) along the edge of different-sized picture display regions.

In the meantime, a method for fabricating a liquid crystal display panel by using the silver-sealant complex dispensing apparatus will be described with reference to accompanying drawings.

Figure 9:
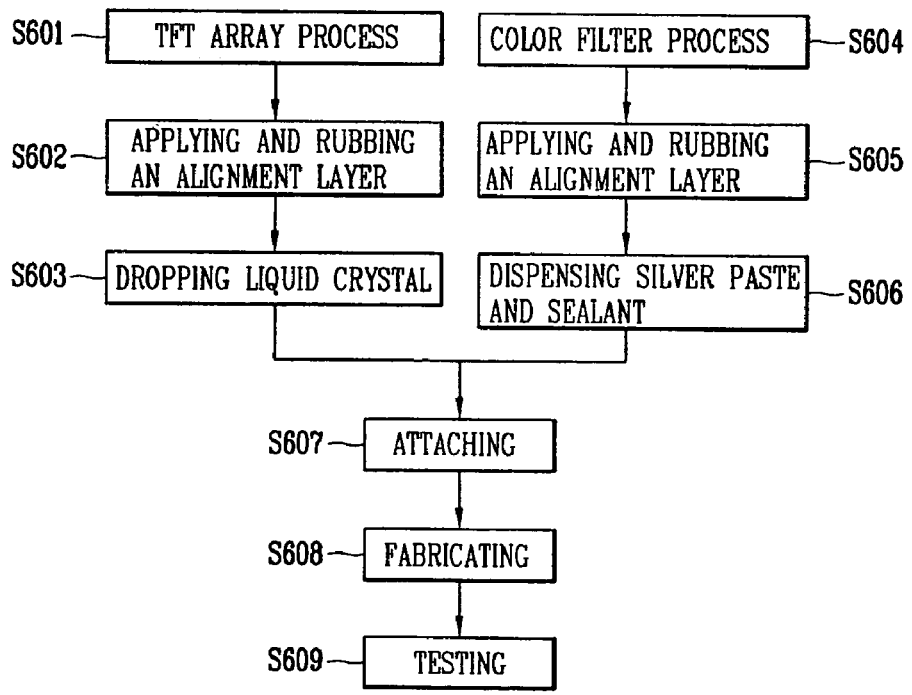
FIG. 9 is a flow chart illustrating fabricating processes of a liquid crystal display panel in accordance with the present invention.

FIG. 9 is a flow chart illustrating fabricating processes of a liquid crystal display panel in accordance with the present invention.

First, a plurality of gate lines and data lines are arranged lengthwise and breadthwise on a transparent insulating substrate, such as glass, to define a plurality of pixel regions, and a TFT (thin film transistor) is formed at each cross region of the gate line and the data line as a switching device as shown at step S601. In addition, a pixel electrode contacting the TFT through the array process is formed to drive a liquid crystal layer according to signal apply through the TFT. In the IPS mode, a pixel electrode and a common electrode are formed through the array process to form a horizontal electric field in the liquid crystal layer.

In addition, on a color filter substrate, a color filter layer having a sub-color filter for implementing color through a color filter process; a black matrix for discriminating the sub-color filter and shielding light passing the liquid crystal layer; and a transparent common electrode (except for IPS) as an opposed electrode of the pixel electrode are formed as shown at step S604.

Herein, in the IPS mode, the common electrode is formed on the array substrate, however the color filter process may be performed after forming a transparent electrode such as ITO (indium tin oxide) on the bottom or the top of the color filter substrate in order to prevent influence of static electricity from the outside.

And, after forming an alignment layer on the array substrate and the color filter substrate respectively, the alignment layer is aligned-processed in order to provide an alignment regulating force or a surface anchoring force (namely, a free tilt angle and an alignment direction) as shown at steps S602, S605. Herein, a rubbing method or a photo-aligning method may be used as the alignment treatment method.

Next, by using the complex dispenser in accordance with the present invention, forming sealant and silver paste on the edge of the color filter substrate and dropping liquid crystal onto the array substrate are simultaneously performed as shown at steps S603, S606. Herein, a spacer may be scattered on the array substrate or the color filter substrate in order to maintain a cell gap uniformly, or a column spacer patterned by an organic film may be formed on the color filter or common electrode in the color filter process.

Herein, liquid crystal may be dropped or dispensed onto the color filter substrate, and sealant and silver paste may be formed onto the array substrate.

Herein, the liquid crystal layer forming method may be largely divided into a vacuum injection method and a drop method, and it will be described in detail.

First, in the vacuum injection method, by dipping a liquid crystal injection hole of a unit liquid crystal display panel separated from a large-sized mother substrate into a container filled with liquid crystal in a chamber set at uniform vacuum and varying a vacuum degree, liquid crystal is injected into a liquid crystal display panel by a pressure difference between the inside and the outside of the liquid crystal display panel. By that method, when liquid crystal fills the inside of the liquid crystal display panel, the liquid crystal layer of the liquid crystal display panel is formed by sealing the liquid crystal injection hole. Accordingly, in case of forming the liquid crystal layer in the liquid crystal display panel by the vacuum injection method, part of the seal pattern has to be open so as to perform a function of the liquid crystal injection hole.

However, the vacuum injection method has following problems.

First, a time for filling the liquid crystal display panel with liquid crystal is very long. In general, because an attached liquid crystal display panel has a gap of approximately several μm per several hundreds μm$^2$, although the vacuum injection method using a pressure difference is applied, liquid crystal injection quantity per unit time is very little. For example, in case of fabricating approximately 15 inch liquid crystal display panel, approximately 8 hours are required in liquid crystal filling, and accordingly productivity may be lowered due to long fabrication time. In addition, with the size increase trend of the liquid crystal display panel, the time required for liquid crystal filling is increased and filling defects may occur. Accordingly, it may be difficult to use injection filling for larger sized liquid crystal display panels.

Second, a consumption amount of liquid crystal is high. Generally, in comparison with a liquid crystal quantity in a container, a liquid crystal quantity actually injected into a liquid crystal display panel is very little. Liquid crystal in the container is exposed to the atmosphere or a certain gases, causing the liquid crystal to deteriorate by reacting with the gas. Accordingly, although the liquid crystal in the container is injected into the plurality of liquid crystal display panels, the remaining, highly-priced, liquid crystal has to be discarded after the injection, and accordingly the price competitiveness of the liquid crystal display device may be lowered.

In order to solve the above-mentioned problems, recently the dropping method is used.

In the dispensing method, liquid crystal is dropped or dispensed on the picture display regions of the large-sized first mother substrates having a plurality of array substrates or the picture display regions of the second mother substrates having a plurality of color filter substrates, liquid crystal is uniformly distributed along the entire area of the picture display regions by a pressure for adhering the first and second mother substrate, and accordingly the liquid crystal layer is formed.

Accordingly, in case of forming the liquid crystal layer on the liquid crystal display panel by the dropping method, in order to prevent liquid crystal from being leaking to the outside of the picture display region, the seal pattern is formed as a closed shape surrounding the edge of the picture display region.

The dropping method may drop liquid crystal in a shorter time than that of the vacuum injection method, and by using the dropping method a liquid crystal layer may be formed very quickly even in a large-sized liquid crystal display panel.

In addition, because only necessary amount of liquid crystal is dropped onto the substrate, there is no need to discard expensive liquid crystal, and accordingly a product may have a competitive price.

Unlike the vacuum injection method, in the dropping method, after forming the liquid crystal layer, the unit liquid crystal display panel is separated from the large-sized mother substrate.

In case of dispensing liquid crystal onto a substrate by the dropping method, the dispenser of the liquid crystal display panel in accordance with the present invention may be used.

Afterward, by attaching the array substrate and the color filter substrate by applying a pressure, a unit liquid crystal display panel is fabricated as shown at step S607.

In the meantime, in fabrication of the unit liquid crystal display panel, in order to improve yield, a method for simultaneously forming a plurality of unit liquid crystal display panels on a large-sized mother substrate is generally used. Accordingly, a process for separating a unit liquid crystal display panel from a large-sized mother substrate by cutting and processing the mother substrate (on which the a plurality of liquid crystal display panels are fabricated) is required as shown at step S608.

Afterward, by testing each liquid crystal display panel, the liquid crystal display panel is obtained as shown at step S609.

As described-above, in the silver-sealant complex dispenser in accordance with the present invention, by minimizing unnecessary operations by performing a silver dot process and a seal process with a complex apparatus, it is possible to prevent efficiency lowering due to idle apparatus in a situation not requiring the silver dot process.

In addition, in the dispensing method of the liquid crystal display panel by using the dispenser, by simultaneously performing the silver dot process and seal pattern forming process quickly, a time required for processes may be reduced, and accordingly productivity may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for dispensing a liquid crystal display panel, comprising:
    providing a plurality of tables at a side of a transferring path of a plurality of substrates, wherein the plurality of substrates includes a first substrate and a second substrate;
    providing a plurality of first dispensers for forming a silver dot and a plurality of second dispensers for forming a seal pattern, wherein the plurality of first dispensers are installed on one side of each table and the plurality of second dispensers are installed on the other side of said each table;
    respectively loading the plurality of substrates on the plurality of tables, wherein the plurality of tables independently operate;
    supplying a silver paste to the plurality of first dispensers including a plurality of first syringes and sealant to the plurality of second dispensers including a plurality of second syringes;
    supplying sealant to the plurality of first dispensers including the plurality of first syringes;
    simultaneously supplying silver paste to the first substrate having a plurality of unit panels through first nozzles at the end of the plurality of first syringes and sealant to the first substrate through second nozzles at the end of the plurality of second syringes; and
    simultaneously supplying sealant to the second substrate through the first nozzles and the second nozzles if silver dot is not required according to the model of the liquid crystal display panel.

2. The method of claim 1, wherein the substrates include a plurality of picture display regions corresponding to the unit panels.

3. The method of claim 1, wherein the unit panels include at least two different sizes.

4. The method of claim 2, wherein the picture display regions have at least two different driving modes.

* * * * *